United States Patent
Pawlowski

(10) Patent No.: US 10,831,653 B2
(45) Date of Patent: *Nov. 10, 2020

(54) FORWARDING CODE WORD ADDRESS

(71) Applicant: Micron Technology, Inc., Boise, ID (US)

(72) Inventor: Joseph Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,817

(22) Filed: Jan. 16, 2019

(65) Prior Publication Data

US 2019/0354479 A1 Nov. 21, 2019

Related U.S. Application Data

(60) Provisional application No. 62/671,923, filed on May 15, 2018.

(51) Int. Cl.
*G11C 29/00* (2006.01)
*G06F 12/06* (2006.01)
*G06F 11/10* (2006.01)

(52) U.S. Cl.
CPC ...... *G06F 12/0646* (2013.01); *G06F 11/1076* (2013.01); *G06F 2212/1032* (2013.01)

(58) Field of Classification Search
CPC ............. G06F 11/1076; G06F 11/1048; G06F 12/0646; G06F 2212/1032; G06F 3/0655; G06F 3/0644; G06F 3/0673; G06F 11/1004; G06F 3/0619
See application file for complete search history.

(56) References Cited

U.S. PATENT DOCUMENTS

| | | | |
|---|---|---|---|
| 2016/0110252 A1 | 4/2016 | Hyun et al. | |
| 2016/0148702 A1 | 5/2016 | Karakulak et al. | |
| 2016/0276035 A1 | 9/2016 | So et al. | |
| 2017/0052846 A1 | 2/2017 | Debenedictis | |
| 2018/0074893 A1 | 3/2018 | Vaidhyanathan et al. | |
| 2019/0354305 A1* | 11/2019 | Pawlowski | G06F 11/1076 |

OTHER PUBLICATIONS

ISA/KR, International Search Report and Written Opinion of the International Searching Authority, Int'l. Appl. No. PCT/US2019/031464, dated Aug. 9, 2019, Korean Intellectual Property Office, Seo-gu, Daejeon, Republic of Korea, 9 pgs.

* cited by examiner

*Primary Examiner* — Guerrier Merant
(74) *Attorney, Agent, or Firm* — Holland & Hart LLP

(57) ABSTRACT

Methods, systems, and devices for forwarding a code word address are described. A memory subsystem, for example, may configure a code word including user data as a forwarded code word when the code word becomes unreliable or invalid close to or beyond an error recovery capability of the memory subsystem. The memory subsystem may configure the forwarded code word using a forwarded code word format and structure, which may include a bit field in the forwarded code word to indicate a code word condition and to store a quantity of duplicates of a forwarding address. When the memory subsystem receives a code word, the memory system may determine the code word as a forwarded code word such that the memory system may determine a forwarding address (e.g., from the code word). The memory subsystem may then use the forwarding address to access user data.

25 Claims, 8 Drawing Sheets

FORWARDING CODE WORD ADDRESS

CROSS REFERENCE

The present application for patent claims priority to U.S. Provisional Patent Application No. 62/671,923 by Pawlowski, entitled "Forwarding Code Word Address" filed May 15, 2018, which is assigned to the assignee hereof and is expressly incorporated by reference in its entirety.

BACKGROUND

The following relates generally to operating a memory subsystem or system and more specifically to forwarding a code word address.

A computing system may include a memory subsystem or system including various kinds of memory devices and controllers that are coupled with one or more buses to manage information in numerous electronic devices such as computers, wireless communication devices, internet of things, cameras, digital displays, and the like. Memory devices are widely used to store information in such electronic devices. Information is stored by programming different states of a memory device. For example, binary devices have two states, often denoted by a logic "1" or a logic "0." In other systems, more than two states may be stored in memory devices. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous DRAM (SDRAM), ferroelectric RAM (FeRAM), magnetic RAM (MRAM), resistive RAM (RRAM), flash memory, not-AND (NAND) memory, phase change memory (PCM), and others. Memory devices may be volatile or non-volatile. Non-volatile memory cells may maintain their stored logic state for extended periods of time even in the absence of an external power source. Volatile memory cells (e.g., DRAM cells) may lose their stored state over time unless they are periodically refreshed by an external power source.

Improving a computing system may include enhancing a memory subsystem's performance, such as reducing power consumption, increasing memory capacity, improving read/write speeds, providing non-volatility by use of persistent memory media, or reducing manufacturing costs at a certain performance point, among other metrics. Techniques to efficiently handle an unreliable or invalid memory address during one or more access operations may be desirable.

DETAILED DESCRIPTION

Figure 1:
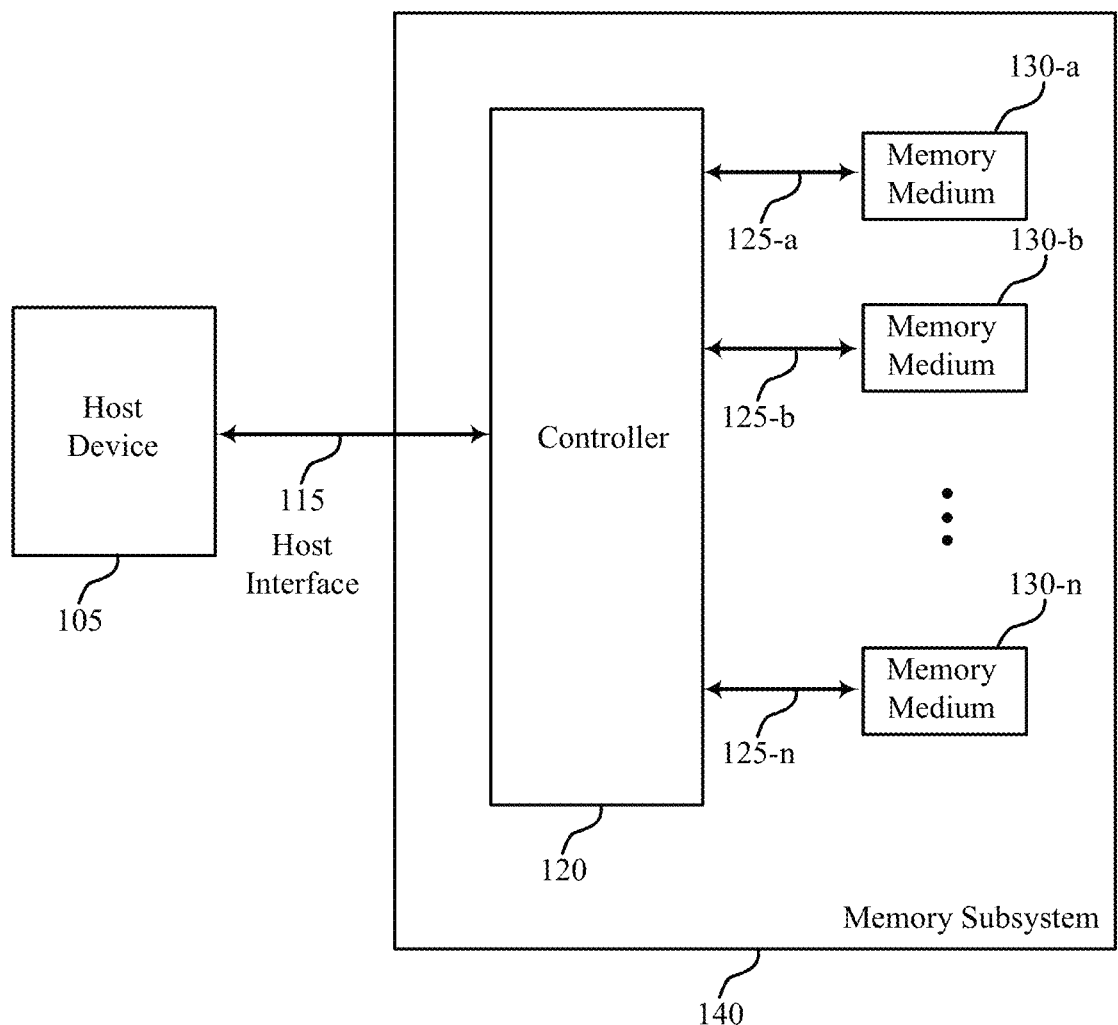
FIG. 1 illustrates an example of a computing system that supports forwarding a code word address in accordance with aspects of the present disclosure.

Performance of a computing system (e.g., a server including a memory subsystem or system) may depend on various factors, such as supplying reliable information to the computing system with a low latency (e.g., a load-to-use latency). In the context of a computing system, a unit of data carrying information may be referred to as a code word. In some cases, a code word may include an amount of user data and additional bits carrying various information to provide reliable user data with a low latency. A code word may be associated with elements of a computing system, such as a memory medium of a memory system or subsystem, and may be communicated during one or more access operations.

In some cases, memory cells of one or more memory dice in the memory medium may support a finite quantity of access operations (e.g., write cycles) before wearing out. When a memory cell wears out, information stored on the memory cell may become unreliable or invalid (e.g., resulting in a faulty bit). When a quantity of memory cells associated with a code word generate faulty bits, the code word may become unreliable or invalid beyond an error recovery capability of a memory subsystem or system. Thus, system reliability may improve by replacing or avoiding an unreliable code word and using a reliable code word (e.g., that includes valid user data). A forwarded code word format and structure (which may also be referred to as a forwarded code word layout) described herein may facilitate a method of substituting a reliable code word for a code word that may be deemed to have become unreliable or invalid (or may have become close to becoming unreliable or invalid) during one or more access operations. Additionally, the present disclosure describes a method or methods of proactively managing code word forwarding events. Many of the following examples are described in the context of a memory subsystem or system; and the described features are applicable to other computing systems and subsystems.

A memory subsystem or system configured according to the present disclosure may include a plurality of port managers to support a high performance of a computing system. The memory subsystem may be coupled with a host device through one or more host interfaces. An individual port manager of the plurality of port managers may be coupled with a memory medium through a channel. The channel may be referred to as an aggregated channel because an aggregated amount or set of data may be exchanged over the channel, in some cases. The memory medium may be configured to include one or more memory dice (e.g., 3D XPoint™ memory dice, which may be referred to as 3DXP dice). In some cases, each of the one of more memory dice may produce an amount of data (e.g., 128 bits of data) as a unit in a sequence of bursts (e.g., sixteen (16) bursts, which may also be referred to as channel bursts), each burst including a second amount of data (e.g., eight (8) bits of data) transmitted over a bus (e.g., an 8-bit wide bus) from the memory die. In some cases, the memory medium may be configured to include a quantity of memory dice (e.g., eleven (11) memory dice) in a parallel configuration. As such, a code word format and structure (e.g., a code word layout) may include a set of bit fields indicative of a plurality of channel bursts across a plurality of channels. A code word may be configured (e.g., formatted) in accordance with a code word layout that defines various fields (e.g., bit fields) of the code word (e.g., a first quantity of fields assigned for an amount of user data with a second quantity of fields assigned for additional data carrying various information to provide reliable user data with a low latency).

When a code word becomes unreliable or nearly unreliable, a memory subsystem may configure the code word as a forwarded code word. In contrast to another code word layout that includes user data, a forwarded code word layout may include a quantity of duplicates of a forwarding address (e.g., a replacement address) to facilitate access of the user data. Additionally, in some cases, a forwarded code word layout may include a quantity of bit fields indicating a code word condition (e.g., a condition indicating the code word being a forwarded code word). The forwarded code word layout may support a low latency operation, which, in turn, may include determining a code word as a forwarded code word and identifying a forwarding address from the forwarded code word. The forwarded code word layout may also support an efficient and robust operation of identifying the forwarding address by providing (e.g., repeatedly, in multiple instances) necessary or important information within the forwarded code word. As such, a memory subsystem may not need to maintain a separate table or an indexing function to keep track of different addresses associated with the user data by employing a method or methods described here.

In some cases, a memory subsystem may proactively elect or determine to configure a code word as a forwarded code word without waiting for the code word (e.g., user data therein) to become unrecoverable beyond an error recovery capability of the memory subsystem. As a code word may include information related to error control (e.g., the additional data carrying various information), a memory subsystem may in some cases determine a quantity of erroneous bits (e.g., faulty bits) in the code word based on performing an error control operation on the code word during an access operation (e.g., read operation). The memory subsystem may determine the quantity of erroneous bits relative to an error threshold (e.g., an error threshold from which the code word may become unreliable or invalid). In some cases, the error threshold may be related to a tolerable limit of a quantity of erroneous bits in a code word (e.g., a quantity of erroneous bits that the code word is preconfigured to recover). The memory subsystem may configure the code word as a forwarded code word in accordance with a forwarded code word layout based on determining the quantity of erroneous bits in the code word. In some cases, the error threshold may be configurable based on a quantity of factors (e.g., a memory technology used to fabricate a memory device of a memory medium, a maturity of such memory technology, a memory medium usage pattern).

Configuring a code word as a forwarded code word may be referred to as retiring a first memory address associated the code word (e.g., user data therein). As a result of retiring the first memory address, the forwarded code word may include a second memory address storing the user data. When the memory subsystem determines to retire the second address associated with the code word, the forwarded code word may include a third memory address storing the user data. A retired memory address may not be used for a code word again and may result in a reduced memory capacity of a memory subsystem. In some cases, a premature error threshold (e.g., an error threshold being inadequately small) may render the memory subsystem inefficient. In other cases, a premature error threshold (e.g., an error threshold being inadequately small) may increase a cost of a memory subsystem by adding excessive memory capacity reserved for forwarded code words.

In some cases, a memory subsystem may use an additional criterion or criteria for retiring a memory address associated with a code word. The additional criterion or criteria may be referred to as an occurrence threshold related to a tolerable limit of a quantity of occurrences for a quantity of erroneous bits in a code word exceeding an error threshold. The occurrence threshold may also be configurable based on a quantity of factors (e.g., a memory technology used to fabricate a memory device of a memory medium, a maturity of such memory technology, a memory medium usage pattern). A memory subsystem controller may configure the occurrence threshold by referencing parameters provide by a host device in some cases. In other cases, the memory subsystem controller may configure the occurrence threshold by referencing tables or other information in firmware at the controller. For example, the firmware may include parameters related to a raw bit error rate of a memory array based on a particular memory technology to fabricate the memory array, a total number of access operations associated with a memory medium, a quantity of code words configured as forwarded code words in a memory medium, among others. A memory subsystem implementing the occurrence threshold, however, may maintain a separate table or an indexing function to track a quantity of such occurrences for memory addresses that may have been identified for retiring. Thus, the memory subsystem may include a structure associated with managing the occurrence threshold to determine whether to retire a memory address or not, in conjunction with an error threshold.

Features of the disclosure introduced herein are further described below at an exemplary system level in the context of FIG. 1. Specific examples of a system and a forwarded code word layout are then described in the context of FIGS. 2 through 3. These and other features of the disclosure are further illustrated by and described with reference to an apparatus diagram of FIG. 4 that describes various components related to a controller as well as flowcharts of FIGS. 5 through 8 that relate to operations of forwarding a code word address.

FIG. 1 illustrates an example of a computing system 100 supports forwarding a code word address in accordance with aspects of the present disclosure. The computing system 100 may include a host device 105 coupled with a device 140 through a host interface 115 (which may also be referred to as a host link). The host device 105 may be or include a server, a system on a chip (SoC), a central processing unit (CPU), or a graphics processing unit (GPU), among other examples. In some examples, the host device 105 may access (e.g., read from, write to) one or more memory media 130 located in the device 140 through the host interface 115.

The host interface 115 (e.g., a host link) may be compatible with or employ a protocol (e.g., the Gen-Z, the Cache Coherent Interconnect for Accelerators (CCIX) protocol) to facilitate access operations between the host device 105 and the one or more memory media 130. The host interface 115 may be configured to transfer data at a first data transfer rate (e.g., 25 gigabytes per second (GBps)) in at least one direction (e.g., sending or receiving). In some examples, a 25 GBps data transfer rate may support approximately 586 million transactions per second when a transaction is 64 bytes. In other examples, a 25 GBps data transfer rate may support approximately 312.5 million transactions per second when a transaction is 128 bytes.

The device 140 may, in some cases, be referred to as a memory system or subsystem, or a memory device. The device 140 may include a controller 120 that may be coupled with the one or more memory media 130 through channels 125. In some cases, the channels 125 may be referred to as aggregated channels 125 including a plurality of other channels (e.g., channels having a smaller bandwidth than the aggregated channel 125) as described with reference to FIG. 2. In some examples, the controller 120 and the one or more memory media 130 may be integrated with, in contact with, or placed on a board (e.g., a peripheral component interconnect express (PCIe) board).

The controller 120 may include various functional blocks that facilitate operations of the device 140 in conjunction with the one or more memory media 130. In some cases, the controller 120 may include aspects of an interface controller to accommodate different specifications, constraints, or characteristics associated with the host interface 115, the channels 125, or both. In some examples, the controller 120 may be an ASIC, a general-purpose processor, other programmable logic device, discrete hardware components (e.g., a chiplet), or it may be a combination of components.

In some cases, the controller 120 may read data from or write data at a memory medium 130 (e.g., a memory medium 130-a) in conjunction with a local controller (e.g., local to the memory medium 130-a) that may perform various operations (e.g., writing data to memory cells, reading data from memory cells, arranging a code word in accordance with the code word layout or the forwarded code word layout). In some examples, the local controller may send requested data to the controller 120 through one of the channels 125, which may be an example of an aggregated channel.

Each memory medium (e.g., a memory medium 130-a) may include multiple memory dice (e.g., sixteen (16) memory dice) to obtain a specified or desired memory capacity of the memory medium. In some examples, the memory dice may include a three-dimensional cross-point array of memory cells including chalcogenide (e.g., 3DXP dice). In other examples, the memory dice may include other kinds of memory devices (e.g., FeRAM dice, MRAM dice, PCM dice). In some examples, a code word (e.g., a code word including 128 bytes of user data) may be divided across the multiple memory dice within a memory medium (e.g., a memory medium 130-a).

In some cases, each memory die (e.g., each 3DXP memory die) of the multiple memory dice may produce a quantity of data (e.g., 128 bits of data) as a unit from the memory die in association with an access operation. The amount of data (e.g., 128 bits of data) may include a sequence of bursts (e.g., sixteen (16) bursts), each burst including an amount of data (e.g., eight (8) bits of data) transmitted over a bus (e.g., 8-bits wide bus) from the memory die. As an example, when a memory medium includes eleven (11) memory dice operating in parallel, and when each memory die of the eleven (11) memory dice produces eight (8) bits of data at a given burst, the memory medium may produce 88 bits of data for a given burst. As eleven (11) memory dice may produce data over a total of sixteen (16) bursts, each burst including 88 bits of data from eleven (11) memory dice, a unit of data associated with the memory medium during an access operation—e.g., the unit of data transmitted over the channel (e.g., an aggregated channel)—may include 1,408 bits.

As such, a code word (e.g., a unit of data during a transaction of an access operation) associated with a memory medium may include 1,408 bits, in this example. In some cases, a burst may be referred to as a channel burst. In some cases, a channel between the controller 120 and a memory medium (e.g., a memory medium 130-a) may include a plurality of channels, in which each channel may be associated with a memory die of the memory medium (e.g., a memory medium 130-a).

The channels 125 may be configured to transport data (e.g., a code word) between the controller 120 and the one or more memory media 130. Each of the channels 125 (e.g., the channel 125-a that may be an example of an aggregated channel) may include a plurality of other channels (e.g., channels having a smaller bandwidth than the channel 125-a) for transporting data (e.g., a code word) in parallel. In some cases, a code word may include user data (e.g., 128 bytes of user data in a code word) and other set of data (e.g., remaining data in the code word). Each of the channels 125 (e.g., the channel 125-a that may be an example of an aggregated channel) may include additional channels to carry information related to various auxiliary functions such as metadata. In some cases, a code word layout or a forwarded code word layout may define how each of the channels 125 (e.g., the channel 125-a) may transport data (e.g., a code word) between the controller 120 and the one or more memory media 130.

In some cases, the controller 120 may receive at least a first portion of a code word associated with a memory medium (e.g., a memory medium 130-a), the code word including a set of bit fields indicative of a plurality of channel bursts across a plurality of channels (e.g., a channel 125-a, an aggregated channel). In some cases, the controller 120 may determine a code word condition indicated in a bit field of the set of bit fields for at least one channel burst of the first portion of the code word, the code word condition including a type of the code word indicating a forwarded code word. In some cases, the controller 120 may determine a forwarding address of the code word based on the code word condition. In some cases, the controller 120 may communicate with the memory medium (e.g., the memory medium 130-a) based on the forwarding address of the code word.

Figure 2:
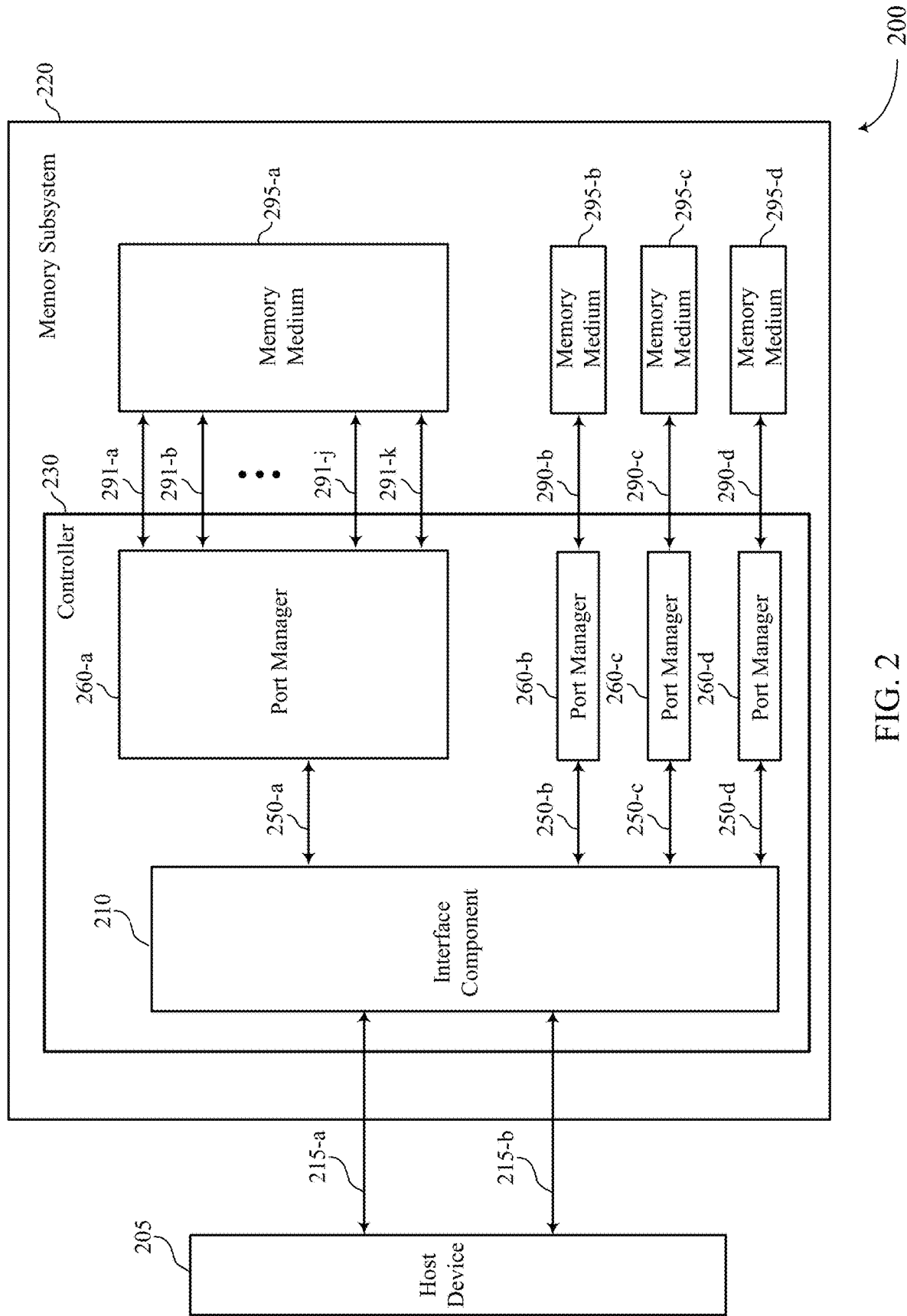
FIG. 2 illustrates an example of a computing system that supports forwarding a code word address in accordance with aspects of the present disclosure.

FIG. 2 illustrates an example of a computing system 200 that supports forwarding a code word address in accordance with aspects of the present disclosure. The computing system 200 may be an example of the computing system 100 described with reference to FIG. 1. The computing system 200 may include a host device 205 coupled with a memory subsystem or system 220 using at least one host interface (e.g., a host interface 215-a). In some cases, the host interfaces 215 may be referred to as a host link or host links. The host device 205 may be an example of the host device 105 described with reference to FIG. 1. The host interfaces 215 may be examples of the host interface 115 described with reference to FIG. 1. In some examples, the host interfaces 215 may be configured to transfer data at a first data transfer rate (e.g., 50 GBps with 25 GBps in each direction).

The computing system 200 may include the memory subsystem or system 220. The memory subsystem or system 220 may be an example of the device 140 described with reference to FIG. 1. The memory subsystem or system 220 may be referred to as a memory device or memory devices. The memory subsystem or system 220 may include a controller 230. The controller 230 may be an example of the controller 120 described with reference to FIG. 1. The controller 230 may include an interface component 210 and a plurality of port managers 260.

The interface component 210 may be configured to facilitate data exchange between the host device 205 and the memory subsystem or system 220 through the host interfaces 215. The interface component 210 may be configured to exchange data with the plurality of port managers 260 (e.g., using signal paths 250). Each signal path of the signal paths 250 may be configured to exchange data at a rate (e.g., 12.8 GBps) different from the first data transfer rate of the host interfaces 215. In some cases, the interface component 210 may be configured to provide a routing network function to allow more than one host interface (e.g., host interface 215-a and host interface 215-b) to be associated with the plurality of port managers 260.

Each port manager (e.g., the port manager 260-b) of the plurality of the port managers 260 may be coupled with a memory medium (e.g., the memory medium 295-b) through an aggregated channel (e.g., the aggregated channel 290-b). In some examples, an individual port manager (e.g., the port manager 260-a) of the plurality of port managers 260 may operate independent of each other (e.g., the port managers 260-b, 260-c, and 260-c) and may support access operations associated with one or more memory media 295. The one or more memory media 295 may be examples of the one or more memory media 130 described with reference to FIG. 1. In some cases, each of the one or more memory media 295 may be referred to as a media port.

Each aggregated channel of the aggregated channels 290 may include one or more channels 291. In some cases, the channels 291 may be referred to as logic channels 291. In some examples, each channel 291 may be associated with a memory die in memory medium (e.g., the memory medium 295-a) and may have a smaller bandwidth than the bandwidth of the aggregated channel (e.g., the aggregated channel 290-b). In some examples, an aggregated channel (e.g., an aggregated channel 290-a) may include eleven (11) channels 291 (e.g., channels 291-a through 291-k). As a person of ordinary skill in the art would appreciate, the plurality of channels 291 (e.g., the channels 291-a through the channel 291-k) are depicted for the port manager 260-a representing one of the aggregated channels 290 (e.g., the aggregated channel 290-a) while the other aggregated channels 290 (e.g., the aggregated channels 290-b, 290-c, and 290-d) are depicted for port managers 260-b, 260-c, and 260-d without showing the plurality of channels 291 associated with each aggregated channel, which is so depicted in order to increase visibility and clarity of the illustrated features.

An individual memory medium (e.g., the memory medium 295-a) of the one or more memory media 295 may include one or more memory devices (e.g., 3DXP dice). In some cases, the memory devices in the individual memory medium may be configured to operate in parallel to obtain a desired aggregated bandwidth through one of the aggregated channels 290. A 3DXP die, as one example, may be configured to have a 8-bits wide data bus and may be associated with each of channels 291 (e.g., the channel 291-a) rendering each channel 291 being 8-bits wide. In addition, a 3DXP die may be configured to produce 128-bits of data during a sequence of sixteen (16) bursts, in which each burst may produce 8-bits wide data over the channel 291. As such, 128-bits of data may be considered as a single unit of data that each 3DXP die generates based on an access command reading memory cells within the 3DXP die.

In some cases, a code word (or a forwarded code word) may be configured to include a set of bit fields indicative of a plurality of channel bursts (e.g., a sequence of sixteen (16) bursts) across a plurality of channels (e.g., eleven (11) channels 291-a through 291-k generating 88 bits of data per channel burst). As such, the code word may in some cases include 1,408 bits of information. The herein description may be understood from a logical view of the memory medium. A larger quantity of physical 3DXP dice than a quantity of logical 3DXP dice may be present in a memory medium accounting for an overhead related to various access operations (e.g., read operation, write operation) associated with the memory medium. Within a memory medium, a code word may be divided into parts and written to or read from more than one die (e.g., 128 byte user data stored across ten 3DXP dice).

Various examples described herein use 3DXP dice to illustrate how the memory media 295 may be configured and operate in conjunction with the port managers 260 in accordance with the methods, devices, and systems supporting a code word format and structure of the present disclosure. In some cases, the memory media 295 may include other types of memory devices employing different memory technologies than 3DXP memory technology, such as FeRAM technology, PCM technology, MRAM technology, among others. As such, the present disclosure is not limited to a particular memory technology (e.g., 3D XPoint™ memory technology).

In some cases, a port manager (e.g., port manager 260-a) of the plurality of the port managers 260 may receive a first portion of a code word associated with a memory medium (e.g., a memory medium 295-a), where the code word may include a set of bit fields indicative of a plurality of channel bursts across a plurality of channels (e.g., a channel 290-a, an aggregated channel). In some cases, the port manager 260-a may identify a first quantity of erroneous bits in the first portion of the code word (e.g., using an error control operation) based on receiving the first portion of the code word. In some cases, the port manager 260-a may determine the first quantity of erroneous bits in the first portion of the code word relative to an error threshold. In some cases, the port manager 260-a may configure, based on determining the first quantity of erroneous bits in the first portion of the code word relative to the error threshold, the code word to include at least one copy of a valid forwarding address associated with the code word. In some cases, the port manager 260-a may communicate with the memory medium 295-a based on configuring the code word.

In some cases, a device or system may include a plurality of memory media, where at least one memory medium of the plurality may be configured to generate a code word including a set of bit fields indicative of a plurality of channel bursts across a plurality of channels, at least one host interface configured to receive an access command from a host device, a plurality of port managers in electronic communication with the at least one host interface and each port manager in electronic communication with different one or more memory media of the plurality. In some examples, at least one port manager of the plurality may be configured to receive, based on receiving the access command, a first portion of the code word including a bit field of the set of bit fields for at least one channel burst of the plurality of channel bursts of the first portion of the code word, determine an indication of a forwarded code word in the first portion of the code word, determine a forwarding address of the code word based on the indication of the forwarded code word, and communicate with the at least one of the plurality of memory media or the at least one host interface based on the forwarding address of the code word.

In some examples of the device or system described herein, the at least one port manager of the plurality may be further configured to determine a code word condition indicated in the bit field, where the indication of the forwarded code word may be determined based on the code word condition.

In some examples of the device or system described herein, the at least one port manager of the plurality may be configured to receive an additional portion of the code word after receiving the first portion of the code word, where the forwarding address of the code word may be determined based on receiving the additional portion of the code word, and where the indication of the forwarded code word may be concurrently determined with receiving the additional portion of the code word.

In some examples of the device or system described herein, the at least one port manager of the plurality may be further configured to determine a first quantity of address bits across a quantity of duplicates of the forwarding address in the code word based on receiving the additional portion of the code word, each of the first quantity of address bits indicating a first logic state of an address bit of the forwarding address.

Some examples of the device or system described herein may also include determining that the first quantity of address bits may be greater than a threshold quantity of duplicates of the forwarding address in the code word.

Some examples of the device or system described herein may also include assigning the first logic state to the address bit of the forwarding address based on determining that the first quantity of address bits may be greater than the threshold quantity of duplicates of the forwarding address in the code word, where the forwarding address of the code word may be determined based on assigning the first logic state to the address bit of the forwarding address.

Figure 3:
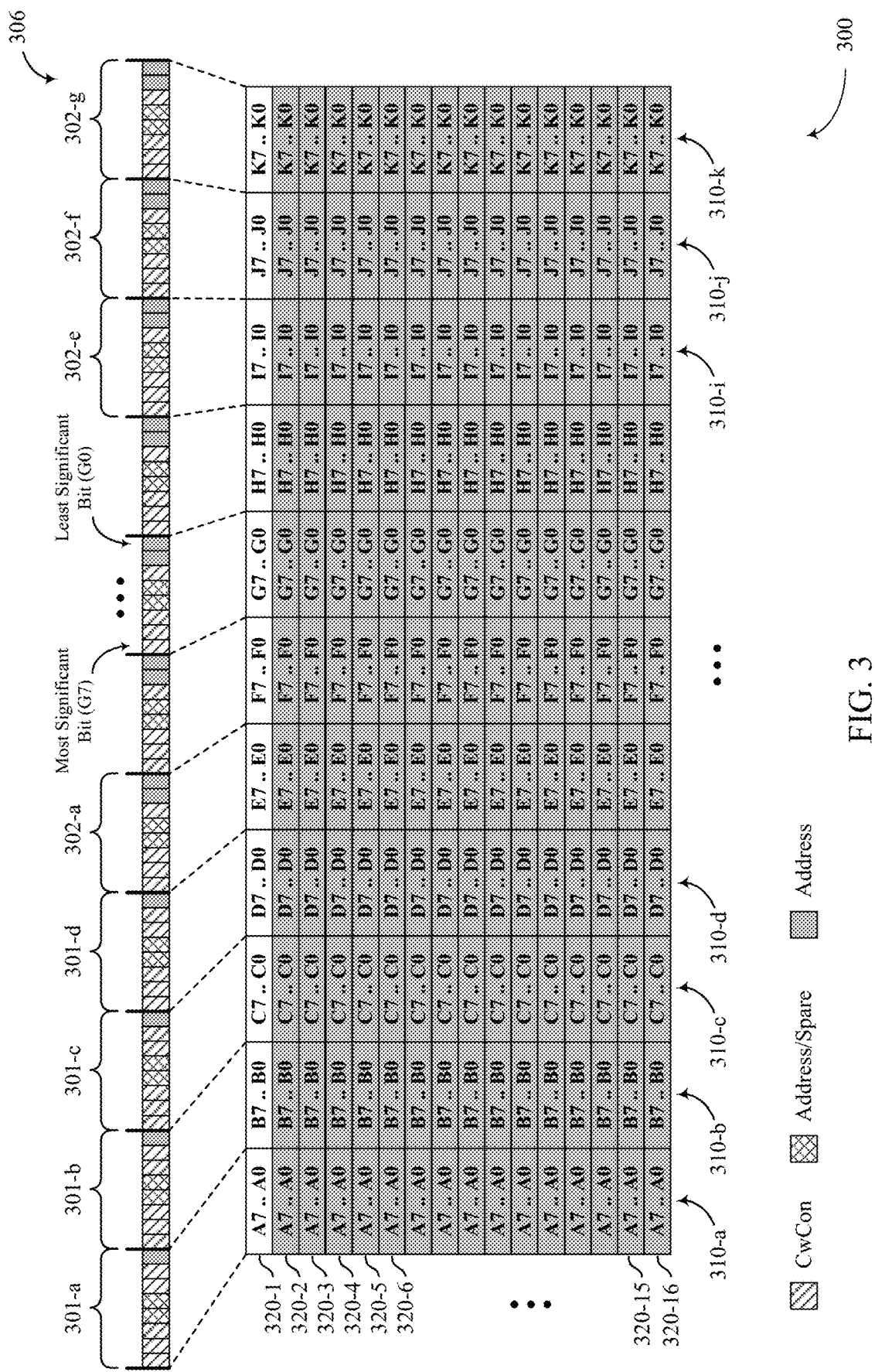
FIG. 3 illustrates an example of a forwarded code word format and structure in accordance with aspects of the present disclosure.

FIG. 3 illustrates an example of a forwarded code word format and structure 300 in accordance with aspects of the present disclosure. The forwarded code word format and structure 300 may depict a forwarded code word layout for an entire code word. FIG. 3 also includes layouts 301 and 302 (also referred to as formats) illustrating various configuration of layouts for an individual channel (e.g., the channel 291-a described with reference to FIG. 2). FIG. 3 also illustrates a layout 306, which may correspond to a portion of a code word (e.g., a subset of bit fields during a first channel burst across the plurality of channels). As an example of a forwarded code word format and structure, the forwarded code word format and structure 300 may include a quantity of bits of data (e.g., 1,408 bits of data) that may be produced by a memory medium (e.g., the memory medium 130-a or the memory medium 295-a described with reference to FIGS. 1 and 2) in response to an access command. The forwarded code word format and structure 300 illustrates that a forwarded code word may include a quantity of duplicates (e.g., 39 or 40 duplicates) of a forwarding address, in which each forwarding address is 34 bits long. Remaining bits within the forwarded code word may include a plurality of bits indicating a code word condition (e.g., 48 bits) and a quantity of spare bits (e.g., up to 22 bits). The spare bits may be configured as address bits, and when there are no spare bits, the forwarded code word may include 40 duplicates of a forwarding address (e.g., each forwarding address is 34 bits long).

The forwarded code word format and structure 300 may span a plurality of channels (e.g., channels 310-a through 310-k). In some cases, each channel (e.g., the channel 310-a) of the plurality of channels 310 may be associated with a 3DXP die, which may include an 8-bits wide data bus. As one example, each channel (e.g., each 3DXP die) may produce a total of 128 bits of data as a single object of a transaction associated with an access command (e.g., a read command) for a 3DXP die. Further, the 128 bits of data may be produced as a sequence of sixteen (16) channel bursts, each channel burst configured to produce 8 bits of data over the 8-bit wide data bus. Hence, each channel (e.g., each of the channels 310-a through 310-k) within a code word layout may correspond to 128 bits of data including sixteen (16) groups of 8-bit of data—e.g., G7 . . . G0 for channel 310-g, where G7 . . . G0 may represent a series of eight (8) 0s and is in which G7 may be the most significant bit (e.g., the eighth bit of the series of eight (8) 0s and 1s) and G0 may be the least significant bit (e.g., the first bit of the series of eight (8) 0s and 1s)), in which each group of sixteen (16) groups of 8-bits of data may be associated with one of sixteen (16) channel bursts.

In one example, the forwarded code word format and structure 300 may span across eleven (11) channels and each channel of the eleven (11) channels may produce 8-bits of data at each channel burst, then a total of 88 bits of data may be produced at each channel burst across the eleven (11) channels (e.g., the first channel burst 320-1 of 88 bits of data). Thus, the forwarded code word format and structure 300 may include 1,408 bits of data (e.g., the first channel burst 320-1 through the 16th channel burst 320-16, each channel burst producing 88 bits of data) as a single object of transaction associated with an access command (e.g., a read command) for a memory medium (e.g., the memory medium 130-a or the memory medium 295-a). The forwarded code word format and structure 300 may support a reliable transaction (e.g., conveying accurate contents of user data) with a low latency (e.g., a low quantity of clock edges to produce the user data) associated with an access command (e.g., a read command, a write command).

The forwarded code word layout may support objectives, including a reliable determination of a code word being a forwarded code word and a reliable determination of a forwarding address to access user data.

At least some (e.g., a majority) of the fields within a forwarded code word layout may be configured to include a quantity of duplicates of the forwarding address. In some cases, the forwarding address may be multiple bits long (e.g., 34-bits long) and may include a plurality (e.g., up to 40 or more) of duplicates of the forwarding address (e.g., a total of 1,360 address bits) may occupy the forwarded code word layout. Twenty-two bits out of 1,360 address bits may be configured as spare bits, in some cases. As such, a forwarded code word may have up to 39 duplicates of the forwarding address and a partial duplicate of the forwarding address, in some cases.

One or more fields within a forwarded code word layout may be configured to indicate a code word condition (e.g., using CwCon bits). In some cases, a code word may be configured in one of multiple possible states (e.g., four states). As an example, the CwCon bits may indicate a code word being one of a normal or a forwarded code word. A forwarded code word may, as one example, include the forwarded code word format and structure 300 described in the present disclosure. A normal code word may include a code word layout that may facilitate a reliable production of user data with a low latency during one or more access operations, for example. Further, the CwCon bits may additionally or alternatively indicate a forwarded code word (or a normal code word) being one of a non-inverted code word or an inverted code word. In some cases, logic states of bits (e.g., 1s and 0s) within an inverted code word may need to be inverted (e.g., flipped, reversed) before information of the inverted code word may be interpreted whereas the non-inverted code word may not need to be inverted before interpreting information of the non-inverted code word.

One or more fields within a forwarded code word layout may be configured as spare bits as an option (e.g., instead of being configured as address bits). In some cases, spare bits may be configured to operate as spares to replace bits designated to have failed for the code word. In some cases, the bits designated to have failed may be associated with memory cells within a 3DXP die, which may have become faulty and have another problem. The spare bits may be configured to replace the bits designated to have failed to support a reliable transaction using the code word (e.g., determining a forwarding address). In some cases, a quantity of address bits may be configured as spare bits. In other words, a quantity of spare bits within a forwarded code word layout may be configurable as exchangeable for a quantity of fields for address bits for the forwarding address. In some cases, the quantity of spare bits may be determined based on a maturity of memory technology (e.g., 3D XPoint™, FeRAM, MRAM technologies) used to build memory media (e.g., memory media 130, memory media 295).

Still referring to FIG. 3, the fields within a forwarded code word layout described herein may be configured to support low latency operation during an access operation associated with a memory medium. FIG. 3 includes layouts 301 and 302 illustrating various configurations of a group of 8-bits for an individual channel (e.g., each of the channels 310-*a* through 310-*k*). For example, each layout of the layouts 301 and 302 includes a group of eight (8) bits that a memory device (e.g., 3DXP die) within a memory medium (e.g., a memory medium 295-*a*) may produce at a given channel burst.

Layout 301 may include one or more (e.g., five) fields of CwCon bits, one or more (e.g., two) fields of address bits (which may be configured as spare bit as an option), and one or more fields (e.g., one) of address bits. Layout 302 may include one or more (e.g., four) fields of CwCon bits, one or more (e.g., two) fields of address bits (which may be configured as spare bits as an option), and one or more (e.g., two) fields of address bits.

As an example of a forwarded code word format and structure 300 (e.g., a forwarded code word layout) that facilitates a low latency operation, a subset of bit fields corresponding to the first channel burst (e.g., the channel burst 320-1) may be configured as illustrated in the layout 306. In the layout 306, at least some if not each group of 8-bits of channel 310-*a* (e.g., A7 . . . A0) through channel 310-*d* (e.g., D7 . . . D0) may be configured to have the layout 301 (e.g., the layouts 301-*a* through 301-d). Also, at least some if not each group of 8-bits of channel 310-*e* (e.g., E7 . . . E0) through channel 310-*k* (e.g., K7 . . . K0) may be configured to have the layout 302 (e.g., the layout 302-*a* through 302-*g*), in some examples.

As a result of configuring the subset of bit fields (e.g., a total of 88 bits including eight (8) bits from each channel of eleven (11) channels) corresponding to the first channel burst (e.g., the first channel burst 320-1) of the forwarded code word format and structure 300 using the layouts 301 and 302, the first channel burst of 88 bits may include information to make a reliable determination of a code word condition—e.g., a code word being a forwarded code word and whether to invert (e.g., reverse, flip) bits in the code word or not. Additionally, a quantity of duplicates of a forwarding address in the exemplary forwarded code word format and structure 300 (e.g., at least 39 duplicates of a forwarding address) may facilitate a reliable determination of the forwarding address associated with the forwarded code word.

Within the first channel burst (e.g., the first channel burst 320-1), the forwarded code word format and structure 300 may include a total of 48 fields of CwCon bits, 4 or 5 fields per channel, across the entire eleven (11) channels (e.g., channels 310-*a* through 310-*k*), for example. A total quantity of fields for CwCon bits (e.g., a total of 48 fields) may represent one of a plurality of code word conditions (e.g., four different conditions of a code word). The total quantity of fields for CwCon bits may be determined to provide a certain redundancy of information that CwCon bits are configured to indicate (e.g., one of four different states) such that a certain quantity of errors in the CwCon field may be tolerated. In some cases, approximately one-half of erroneous CwCon bits may be tolerated to indicate a valid condition of a code word. In addition, a quantity of CwCon fields (e.g., 48 fields of CwCon bits) are distributed across entire channels (e.g., eleven (11) channels) to provide a probability of having errors associated with CwCon bits distributed approximately equal across the entire channels.

Furthermore, as a port manager (e.g., the port manager 260-*a* described with reference to FIG. 2) may receive CwCon bits at the first channel burst (e.g., the first channel burst 320-1) of a code word associated with a memory medium (e.g., the memory medium 295-*a*), the port manager may interpret (e.g., parse, identify) information in the CwCon bits (e.g., a total of 48 CwCon bits) to reliably determine that a code word is a forward code word (and whether to invert bits within the forwarded code word or not). The port manager may initiate operations associated with the code word based on determining the code word condition upon interpreting the information in the CwCon bits at the first channel burst while the port manager receives an additional portion (e.g., a remainder) of the code word (e.g., the second channel burst 320-2 and on).

For example, the port manager may initiate inverting at least some of the bits of the code word when the port manager interprets CwCon bits to indicate that the code word is an inverted code word. In other examples, the port manager may initiate determining a forwarding address of the code word based on determining the code word condition including a type of the code word indicating a forwarded code word. As such, the port manager may initiate various operations without having to wait until the port manager receives the entire code word so as to facilitate a low latency operation associated with the code word.

Within the first channel burst (e.g., the first channel burst 320-1), there may be up to a total of 22 fields of spare bits, 2 fields per channel, across the entire eleven (11) channels (e.g., channels 310-*a* through 310-*k*), for example. As described herein, the faulty bits may be associated with memory cells of a memory device (e.g., a 3DXP die) within a memory medium (e.g., memory medium 295-*a*).

Furthermore, as a port manager (e.g., a port manager 260-*a*) may receive spare bits at the first channel burst (e.g., the first channel burst 320-1) of a code word associated with a memory medium (e.g., the memory medium 295-*a*), the port manager may implement spare bits to replace faulty bits as soon as the port manager receives the faulty bits at a later channel burst. For example, when the port managers determines that D1 bit of the channel 310-*d* within the third channel burst 320-3 may be a first faulty bit, the port manager may replace the D1 bit of the channel 310-*d* within the third channel burst 320-3 with a first spare bit (e.g., a spare bit A4 of the channel 310-*a* within the first channel burst 320-1) as soon as the port manager receives the faulty D1 bit at the third channel burst 320-3. As such, the port manager may substitute spare bits for faulty bits upon their arrival to facilitate a reliable determination of a forwarding address with accurate information in the address bits, for example. In this manner, the port manager may implement the spare bits while the port manager receives an additional portion (e.g., a remainder) of the code word so as to facilitate a low latency operation associated with the code word.

Still referring to FIG. 3, a memory subsystem (e.g., a controller 120 or a port manager 260-a described with reference to FIGS. 1 and 2) may determine a valid forwarding address from a code word associated with a memory medium (a memory medium 295-a) based on determining that the code word is a forwarded code word (e.g., based on interpreting information in CwCon bits received at the first channel burst as described herein). The memory system may communicate with the memory medium using the forwarding address to access user data associated with the code word.

In some cases, a port manager (e.g., a port manager 260-a) may receive a remainder of the forwarded code word to determine the forwarding address. As such, the port manager may have an entire set of duplicates of the forwarding address (e.g., 39, 40, or any other quantity of duplicates of a forwarding address as illustrated in a forwarded code word format and structure 300).

In some cases, the port manager may identify a logic state (e.g., a majority logic state) of an address bit (e.g., address bit A15 out of 34 address bits) of the forwarding address across the entire set of duplicates of the forwarding address (e.g., 39 fields of address bit A15 out of 39 duplicates of the forwarding address). The port manager may determine a first quantity of address bits indicating a first logic state (e.g., a logic state of "1")—e.g., 31 fields of address bit A15 may have logic state of "1." The port manager may determine a second quantity of address bits indicating a second logic state (e.g., a logic state of "0")—e.g., eight (8) fields of address bit A15 may have logic state of "0." Subsequently, the port manager may compare the first quantity of address bits (e.g., 31 fields of address bit A15) and the second quantity of address bits (e.g., eight (8) fields of address bit A15), and determine the majority state (e.g., the logic state of "1") of the address bit (e.g., address bit A15) of the forwarding address. The port manager may repeat this process of determining a logic state of an address bit as the correct logic state for the entire quantity of bits (e.g., 34 address bits) in a forwarding address. In some examples, the operation of identifying a logic state, such as a majority logic state (e.g., greater than one-half of the possible quantity, for example 20 out of 39) of an address bit may be implemented as a majority gate circuit understood by a person of ordinary skill in the art.

In some cases, the port manager may use a threshold to determine a correct logic state of an address bit of a forwarding address. The threshold may be determined based on a quantity of factors—e.g., a memory technology used to fabricate a memory device of a memory medium, a maturity of such memory technology, a memory medium usage pattern, relative robustness of memory cells associated with a forwarded code word (e.g., memory cells associated with a retired memory address). For example, the threshold may be less (e.g., 15 address bits) than a majority (e.g., 20 address bits) or greater (e.g., 30 address bits) than the majority (e.g., 20 address bits).

In some cases, a port manager (e.g., a port manager 260-a) may receive a portion of the forwarded code word to determine the forwarding address. The portion of the forwarded code word may include a plurality of duplicates of the forwarding address (e.g., 19 duplicates instead of the entire 39 duplicates of a forwarding address in the exemplary forwarded code word format and structure 300). The port manager may determine a first quantity of address bits (e.g., 18 fields of address bit A15) of address across the plurality of duplicates of the forwarding address (e.g., 19 fields of address bit A15), each of the first quantity of address bits indicating a first logic state (e.g., 18 fields of address bit A15 indicating a logic state of "1") of an address bit of the forwarding address.

The port manager may determine that the first quantity of address bits (e.g., 18 address bits) is greater than a threshold (e.g., 15 address bits) of a quantity of duplicates of the forwarding address (e.g., 19 duplicates of a forwarding address) in at least the portion of the code word. The port manager may assign the first logic state (e.g., the logic state "1") to the address bit (e.g., address bit A15) of the forwarding address as the correct logic state based on determining that the first quantity of address bits (e.g., 18 address bits) is greater than the threshold (e.g., 15 address bits) of the quantity of duplicates of the forwarding address (e.g., 19 duplicates of a forwarding address in the portion of the forwarded code word). As such, the port manager may determine a valid forward address based on receiving a portion of the forwarded code word so as to facilitate a low latency operation associated with the forwarded code word.

Aspects of proactively managing code word forwarding events in accordance with the present disclosure are further described below.

A memory subsystem (e.g., a controller 120 or a port manager 260-a described with reference to FIGS. 1 and 2) may determine to configure a code word as a forwarded code word in accordance with a forwarded code word layout (e.g., a forwarded code word format and structure 300) when the code word becomes unreliable or nearly unreliable beyond an error recovery capability of the memory subsystem. In some cases, the memory subsystem may determine to configure a code word as a forwarded code word (e.g., retiring a memory address associated with the code word) without waiting for the code word (e.g., user data therein) becoming unrecoverable.

During an access operation (e.g., read operation), the memory subsystem may determine that a quantity of erroneous bits in a code word relative to an error threshold. In some cases, the error threshold may be related to a tolerable limit of a quantity of erroneous bits in a code word. The memory subsystem may configure the code word as a forwarded code word based on determining the quantity of erroneous bits in the code word. In some cases, a memory subsystem may use an additional criteria for retiring a memory address associated with a code word. The additional criteria may be referred to as an occurrence threshold related to a tolerable limit of a quantity of occurrences for a quantity of erroneous bits in a code word exceeding the error threshold.

In some cases, a port manager (e.g., a port manager 260-a) may receive a first portion of a code word associated with a memory medium (e.g., a memory medium 295-a), where the code word may include a set of bit fields indicative of a plurality of channel bursts across a plurality of channels. The port manager may identify a first quantity of erroneous bits in the first portion of the code word using an error control operation (e.g., an error correction code (ECC) operation). The port manager may determine the first quantity of erroneous bits in the first portion of the code word relative to an error threshold. The port manager may configure, based on determining the first quantity of erroneous bits in the first portion of the code word relative to the error threshold, the code word to include at least one copy of a valid forwarding address associated with the code word (e.g., user data). The port manager may communicate with the memory medium based on configuring the code word.

For example, a code word layout may include an amount of user data (e.g., 1,024 bits of user data) and additional information related to error control operation. In some cases, the additional bits may facilitate an error correction code (ECC) operation performed on a code word such that correct user data may be produced during one or more access operations. In some examples, up to sixteen (16) erroneous bits may be detected and corrected for a code word. As such, the error threshold may be determined to be 16, in some cases. In other cases, the error threshold may be determined to be less than sixteen (16) (e.g., 12 or 13) to provide a robust outcome of an access operation (e.g., accurate user data). The error threshold may be configurable (e.g., programmable) to support an efficient operation of the memory subsystem based on a quantity of factors (e.g., a memory technology used to fabricate a memory device of a memory medium, a maturity of such memory technology, a memory medium usage pattern). In some cases, an error threshold may indicate or be associated with a quantity of erroneous bits that the code word is preconfigured to recover.

When the port manager determines to configure a code word as a forwarded code word in accordance with a forwarded code word layout, the port manager may configure a plurality of bits (e.g., CwCon bits as illustrated in the forwarded code word format and structure 300) across at least one channel burst of the plurality of channel bursts of the code word, the plurality of bits indicating a code word condition corresponding to a forwarded code word. Also, the port manager may store a plurality of copies of the valid forwarding address in the code word (e.g., at least 39 duplicates of a forwarding address as illustrated in the forwarded code word format and structure 300).

In some cases, the port manager may configure a portion of at least one of the plurality of copies of the valid forwarding address as spare bits. As such, the port manager may proactively determine a code word becoming unreliable, invalid or nearly unreliable or invalid, and configure the code word as a forwarded code word in accordance with a forwarded code word layout (e.g., the forwarded code word format and structure 300). As the forwarded code word includes sufficient information (e.g., CwCon bits indicating a forwarded code word, a quantity of duplicates of a forwarding address), the port manager may not need to manage a separate table or indexing function to track different addresses associated with a particular user data.

In some cases, the port manager may identify an occurrence threshold based on determining the first quantity of erroneous bits relative to the error threshold. The occurrence threshold may indicate a tolerable limit of a quantity of occurrences (e.g., an allowed quantity of occurrences) for the first quantity of erroneous bits exceeding the error threshold. For example, when the occurrence threshold is 1, when a code word may be determined to have a quantity of erroneous bits exceeding an error threshold (e.g., 13 erroneous bits) for the first time, the port manager may configure the code ward as a forwarded code word.

In another example, when the occurrence threshold is greater than one (e.g., more than one occurrences), the port manager may not configure a code word that may be determined to have a quantity of erroneous bits exceeding an error threshold (e.g., 13 erroneous bits) for the first time. Instead, the port manager (or a component of the memory subsystem) may track a quantity of such occurrence for the code word prior to determining to configure the code word as a forwarded code word. As such, an occurrence threshold greater than 1 may result in a complexity in determining to configure a code word as a forwarded code word (e.g., retiring a memory address associated with the code word). In some cases, the occurrence threshold is configurable (e.g., programmable) to support an efficient operation of the memory subsystem based on a quantity of factors—e.g., a memory technology used to fabricate a memory device of a memory medium, a maturity of such memory technology, a memory medium usage pattern.

Figure 4:
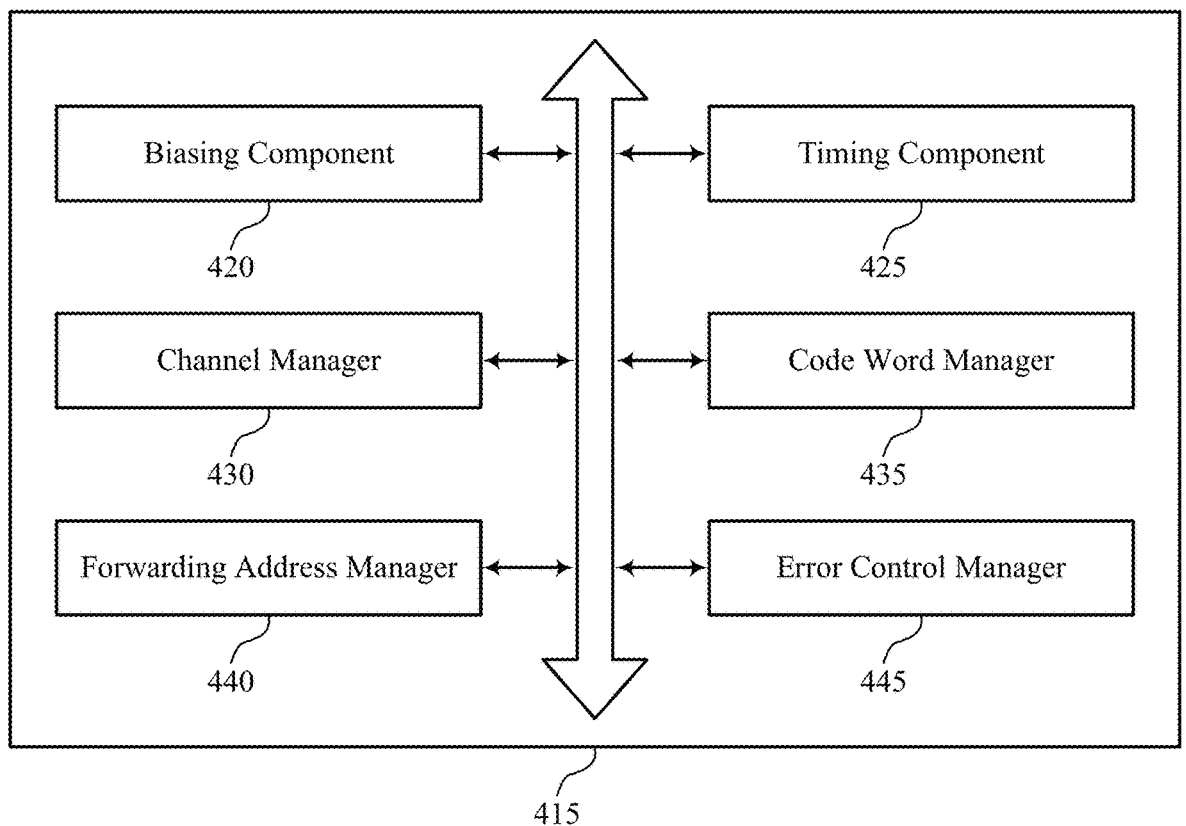
FIG. 4 shows a block diagram of a device that supports forwarding a code word address in accordance with aspects of the present disclosure

FIG. 4 shows a block diagram 400 of a controller 415 that supports forwarding a code word address in accordance with aspects of the present disclosure. The controller 415 may be an example of aspects of the controller 120 or the controller 230 described with reference to FIGS. 1 through 2. The controller 415 may include a biasing component 420, a timing component 425, a channel manager 430, a code word manager 435, a forwarding address manager 440, and an error control manager 445. Each of these modules may communicate, directly or indirectly, with one another (e.g., via one or more buses).

Channel manager 430 may receive a first portion of a code word associated with a memory medium, the code word including a set of bit fields indicative of a set of channel bursts across a set of channels. In some cases, the channel manager 430 may communicate with the memory medium based on the forwarding address of the code word. In some cases, the channel manager 430 may receive a second portion of the code word, concurrent with determining the code word condition, based on receiving the first portion of the code word. In some cases, the channel manager 430 may receive an additional portion of the code word based on the code word condition, where the forwarding address of the code word may be determined based on receiving the additional portion of the code word. In some cases, the channel manager 430 may transmit an access command to the memory medium using the forwarding address of the code word, where communicating with the memory medium may be based on transmitting the access command. In some cases, the channel manager 430 may receive a first portion of a code word associated with a memory medium, the code word including a set of bit fields indicative of a set of channel bursts across a set of channels. In some cases, the channel manager 430 may communicate with the memory medium based on configuring the code word.

Code word manager 435 may determine a code word condition indicated in a bit field of the set of bit fields for at least one channel burst of the first portion of the code word, the code word condition including a type of the code word indicating a forwarded code word. In some cases, the bit field indicating the code word condition are configured to convey valid information when a first quantity of the bit field are erroneous, where the first quantity may be less than a threshold associated with a fault tolerance level of the bit field indicating the code word condition.

Forwarding address manager 440 may determine a forwarding address of the code word based on the code word condition. In some cases, the forwarding address manager 440 may configure a portion of at least one of the copies of the valid forwarding address as spare bits, where configuring the code word may be based on configuring the portion of the at least one of the copies of the valid forwarding address as spare bits. In some cases, the forwarding address manager 440 may determine a first quantity of address bits across the set of duplicates of the forwarding address, each bit of the first quantity of address bits indicating a first logic state of an address bit of the forwarding address, based on the code word condition, where the forwarding address of the code word may be determined based on the first quantity of address bits of the forwarding address.

In some cases, the forwarding address manager 440 may determine that the first quantity of address bits is greater than a threshold quantity of duplicates of the forwarding address in at least the first portion of the code word. In some cases, the forwarding address manager 440 may assign the first logic state to the address bit of the forwarding address based on determining that the first quantity of address bits is greater than the threshold quantity of duplicates of the forwarding address, where the forwarding address of the code word may be determined based on assigning the first logic state to the address bit of the forwarding address. In some cases, the forwarding address manager 440 may identify a majority logic state of an address bit of the forwarding address across a quantity of duplicates of the forwarding address in the code word.

In some cases, the forwarding address manager 440 may assign the majority logic state to the address bit of the forwarding address based on identifying the majority logic state of the address bit, where the forwarding address of the code word may be determined based on assigning the majority logic state to the address bit of the forwarding address. In some cases, the forwarding address manager 440 may determine a second quantity of address bits across the quantity of duplicates of the forwarding address in the code word, each of the second quantity of address bits indicating a second logic state of the address bit of the forwarding address. In some cases, the forwarding address manager 440 may compare the first quantity of address bits indicating the first logic state and the second quantity of address bits indicating the second logic state.

In some cases, the forwarding address manager 440 may determine the majority logic state of the address bit of the forwarding address based on the comparison. In some cases, the forwarding address manager 440 may configure, based on the first quantity of erroneous bits in the first portion of the code word relative to the error threshold, the code word to include at least one copy of a valid forwarding address associated with the code word. In some cases, the forwarding address manager 440 may configure a bit field of the set of bit fields for at least one channel burst of the set of channel bursts of the code word, the bit field indicating a code word condition corresponding to a forwarded code word, where configuring the code word may be based on configuring the bit field.

In some cases, the forwarding address manager 440 may store copies of the valid forwarding address in the code word, where configuring the code word may be based on storing the copies of the valid forwarding address. In some cases, the at least one channel burst of the first portion of the code word includes a set of duplicates of the forwarding address.

In some cases, the forwarded code word includes the bit field indicating the code word condition and a quantity of duplicates of the forwarding address, and determining the forwarding address of the code word is based on the quantity of duplicates of the forwarding address. In some cases, identifying the majority logic state of the address bit of the forwarding address further includes determining a first quantity of address bits across the quantity of duplicates of the forwarding address in the code word, each of the first quantity of address bits indicating a first logic state of the address bit of the forwarding address.

Error control manager 445 may identify a first quantity of erroneous bits in the first portion of the code word using an error control operation based on receiving the first portion of the code word. In some cases, the error control manager 445 may determine the first quantity of erroneous bits in the first portion of the code word relative to an error threshold. In some cases, the error control manager 445 may identify the error threshold based on identifying the first quantity of erroneous bits, the error threshold associated with a quantity of erroneous bits that the code word is preconfigured to recover.

In some cases, the error control manager 445 may compare the error threshold and the first quantity of erroneous bits, where the first quantity of erroneous bits relative to the error threshold may be determined based on comparing the error threshold and the first quantity of erroneous bits. In some cases, the error control manager 445 may configure the error threshold to a value based on receiving the first portion of the code word associated with the memory medium. In some cases, the error control manager 445 may identify an occurrence threshold based on the first quantity of erroneous bits relative to the error threshold, the occurrence threshold indicating an allowed quantity of occurrences for the first quantity of erroneous bits exceeding the error threshold, where configuring the code word may be based on the occurrence threshold and the error threshold.

In some cases, determining the first quantity of erroneous bits in the first portion of the code word relative to the error threshold further includes determining that the first quantity of erroneous bits in the first portion of the code word is equal to or greater than the error threshold. In some cases, identifying the first quantity of erroneous bits in the first portion of the code word using the error control operation includes performing an error correction code (ECC) operation on the first portion of the code word.

Figure 5:
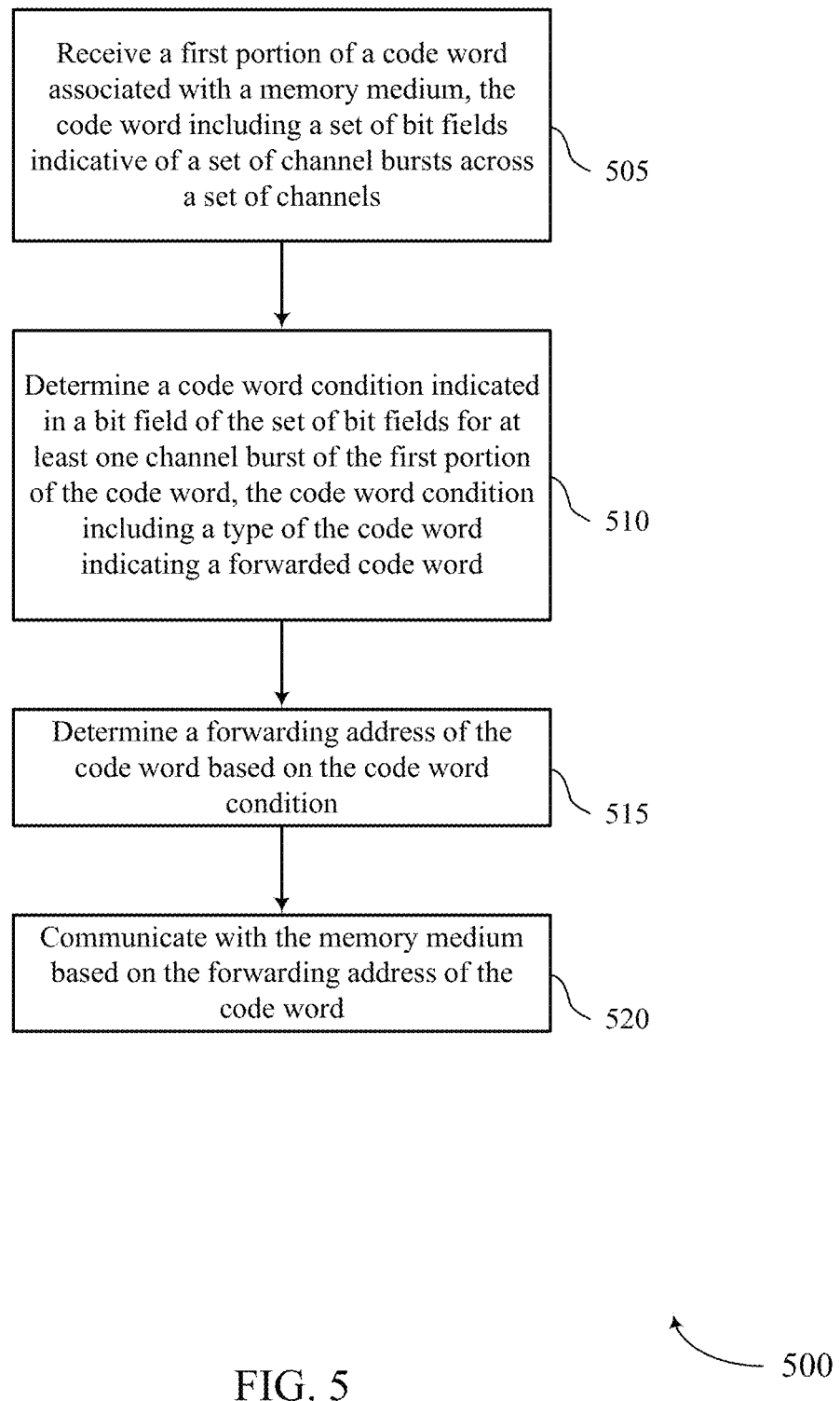
FIGS. 5 through 8 illustrate a method or methods supporting forwarding a code word address in accordance with aspects of the present disclosure.

FIG. 5 shows a flowchart illustrating a method 500 that supports forwarding a code word address in accordance with aspects of the present disclosure. The operations of method 500 may be implemented by a controller or its components as described herein. For example, the operations of method 500 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 505 the controller may receive a first portion of a code word associated with a memory medium, the code word including a set of bit fields indicative of a plurality of channel bursts across a plurality of channels. The operations of 505 may be performed according to the methods described with reference to FIGS. 2-4. In certain examples, aspects of the operations of 505 may be performed by a channel manager as described with reference to FIG. 4.

At 510 the controller may determine a code word condition indicated in a bit field of the set of bit fields for at least one channel burst of the first portion of the code word, the code word condition including a type of the code word indicating a forwarded code word. The operations of 510 may be performed according to the methods described with reference to FIGS. 2-4. In certain examples, aspects of the operations of 510 may be performed by a code word manager as described with reference to FIG. 4.

At 515 the controller may determine a forwarding address of the code word based on the code word condition. The operations of 515 may be performed according to the methods described with reference to FIGS. 2-4. In certain examples, aspects of the operations of 515 may be performed by a forwarding address manager as described with reference to FIG. 4.

At 520 the controller may communicate with the memory medium based on the forwarding address of the code word. The operations of 520 may be performed according to the methods described with reference to FIGS. 2-4. In certain examples, aspects of the operations of 520 may be performed by a channel manager as described with reference to FIG. 4.

An apparatus for performing the method 500 is described. The apparatus may include means for receiving a first portion of a code word associated with a memory medium, the code word including a set of bit fields indicative of a plurality of channel bursts across a plurality of channels, means for determining a code word condition indicated in a bit field of the set of bit fields for at least one channel burst of the first portion of the code word, the code word condition including a type of the code word indicating a forwarded code word, means for determining a forwarding address of the code word based on the code word condition, and means for communicating with the memory medium based on the forwarding address of the code word.

Another apparatus for performing the method 500 is described. The apparatus may include a memory medium and a controller in electronic communication with the memory medium, where the controller may be operable to receive a first portion of a code word associated with the memory medium, the code word including a set of bit fields indicative of a plurality of channel bursts across a plurality of channels, determine a code word condition indicated in a bit field of the set of bit fields for at least one channel burst of the first portion of the code word, the code word condition including a type of the code word indicating a forwarded code word, determine a forwarding address of the code word based on the code word condition, and communicate with the memory medium based on the forwarding address of the code word.

In some examples of the method 500 and apparatus described herein, the forwarded code word includes the bit field indicating the code word condition and a quantity of duplicates of the forwarding address, and determining the forwarding address of the code word may be based on the quantity of duplicates of the forwarding address. In some examples of the method 500 and apparatus described herein, the at least one channel burst of the first portion of the code word includes a plurality of duplicates of the forwarding address.

Some examples of the method 500 and apparatus described herein may further include processes, features, means, or instructions for determining a first quantity of address bits across the plurality of duplicates of the forwarding address, each bit of the first quantity of address bits indicating a first logic state of an address bit of the forwarding address, based on the code word condition, where the forwarding address of the code word may be determined based on the first quantity of address bits of the forwarding address.

Some examples of the method 500 and apparatus described herein may further include processes, features, means, or instructions for determining that the first quantity of address bits may be greater than a threshold quantity of duplicates of the forwarding address in at least the first portion of the code word. Some examples of the method 500 and apparatus described herein may further include processes, features, means, or instructions for assigning the first logic state to the address bit of the forwarding address based on determining that the first quantity of address bits may be greater than the threshold quantity of duplicates of the forwarding address, where the forwarding address of the code word may be determined based on assigning the first logic state to the address bit of the forwarding address.

Some examples of the method 500 and apparatus described herein may further include processes, features, means, or instructions for receiving a second portion of the code word, concurrent with determining the code word condition, based on receiving the first portion of the code word. Some examples of the method 500 and apparatus described herein may further include processes, features, means, or instructions for receiving an additional portion of the code word based on the code word condition, where the forwarding address of the code word may be determined based on receiving the additional portion of the code word.

Some examples of the method 500 and apparatus described herein may further include processes, features, means, or instructions for identifying a majority logic state of an address bit of the forwarding address across a quantity of duplicates of the forwarding address in the code word. Some examples of the method 500 and apparatus described herein may further include processes, features, means, or instructions for assigning the majority logic state to the address bit of the forwarding address based on identifying the majority logic state of the address bit, where the forwarding address of the code word may be determined based on assigning the majority logic state to the address bit of the forwarding address.

In some examples of the method 500 and apparatus described herein, identifying the majority logic state of the address bit of the forwarding address further includes determining a first quantity of address bits across the quantity of duplicates of the forwarding address in the code word, each of the first quantity of address bits indicating a first logic state of the address bit of the forwarding address. Some examples of the method 500 and apparatus described herein may further include processes, features, means, or instructions for determining a second quantity of address bits across the quantity of duplicates of the forwarding address in the code word, each of the second quantity of address bits indicating a second logic state of the address bit of the forwarding address.

Some examples of the method 500 and apparatus described herein may further include processes, features, means, or instructions for comparing the first quantity of address bits indicating the first logic state and the second quantity of address bits indicating the second logic state. Some examples of the method 500 and apparatus described herein may further include processes, features, means, or instructions for determining the majority logic state of the address bit of the forwarding address based on the comparison.

In some examples of the method 500 and apparatus described herein, the bit field indicating the code word condition may be configured to convey valid information when a first quantity of the bit field may be erroneous, where the first quantity may be less than a threshold associated with a fault tolerance level of the bit field indicating the code word condition. Some examples of the method 500 and apparatus described herein may further include processes, features, means, or instructions for transmitting an access command to the memory medium using the forwarding address of the code word, where communicating with the memory medium may be based on transmitting the access command.

Figure 6:
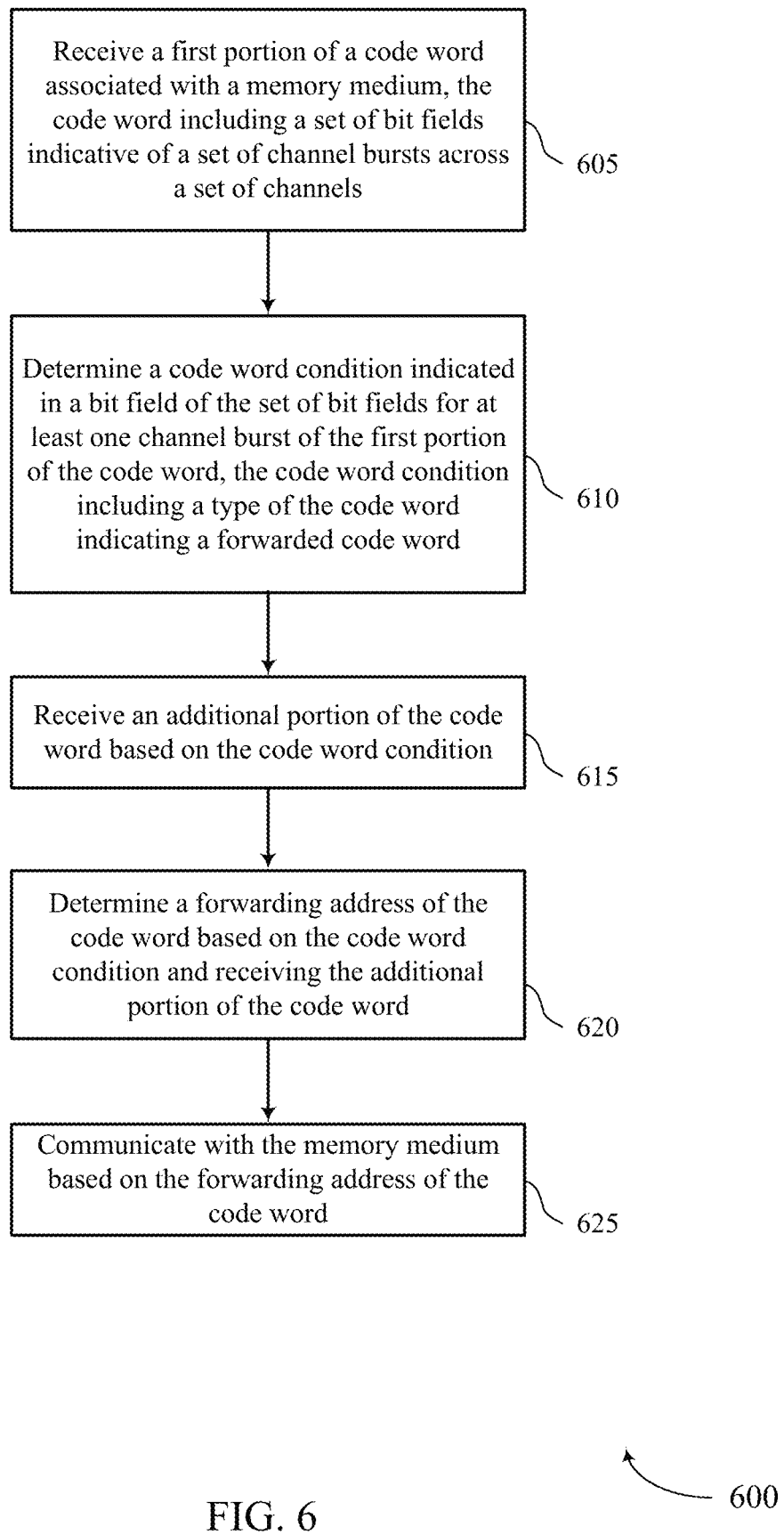

FIG. 6 shows a flowchart illustrating a method 600 that supports forwarding a code word address in accordance with aspects of the present disclosure. The operations of method 600 may be implemented by a controller or its components as described herein. For example, the operations of method 600 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 605 the controller may receive a first portion of a code word associated with a memory medium, the code word including a set of bit fields indicative of a set of channel bursts across a set of channels. The operations of 605 may be performed according to the methods described with reference to FIGS. 2-4. In certain examples, aspects of the operations of 605 may be performed by a channel manager as described with reference to FIG. 4.

At 610 the controller may determine a code word condition indicated in a bit field of the set of bit fields for at least one channel burst of the first portion of the code word, the code word condition including a type of the code word indicating a forwarded code word. The operations of 610 may be performed according to the methods described with reference to FIGS. 2-4. In certain examples, aspects of the operations of 610 may be performed by a code word manager as described with reference to FIG. 4.

At 615 the controller may receive an additional portion of the code word based on the code word condition. The operations of 615 may be performed according to the methods described with reference to FIGS. 2-4. In certain examples, aspects of the operations of 615 may be performed by a channel manager as described with reference to FIG. 4.

At 620 the controller may determine a forwarding address of the code word based on the code word condition and receiving the additional portion of the code word. The operations of 620 may be performed according to the methods described with reference to FIGS. 2-4. In certain examples, aspects of the operations of 620 may be performed by a forwarding address manager as described with reference to FIG. 4.

At 625 the controller may communicate with the memory medium based on the forwarding address of the code word. The operations of 625 may be performed according to the methods described with reference to FIGS. 2-4. In certain examples, aspects of the operations of 625 may be performed by a channel manager as described with reference to FIG. 4.

Figure 7:
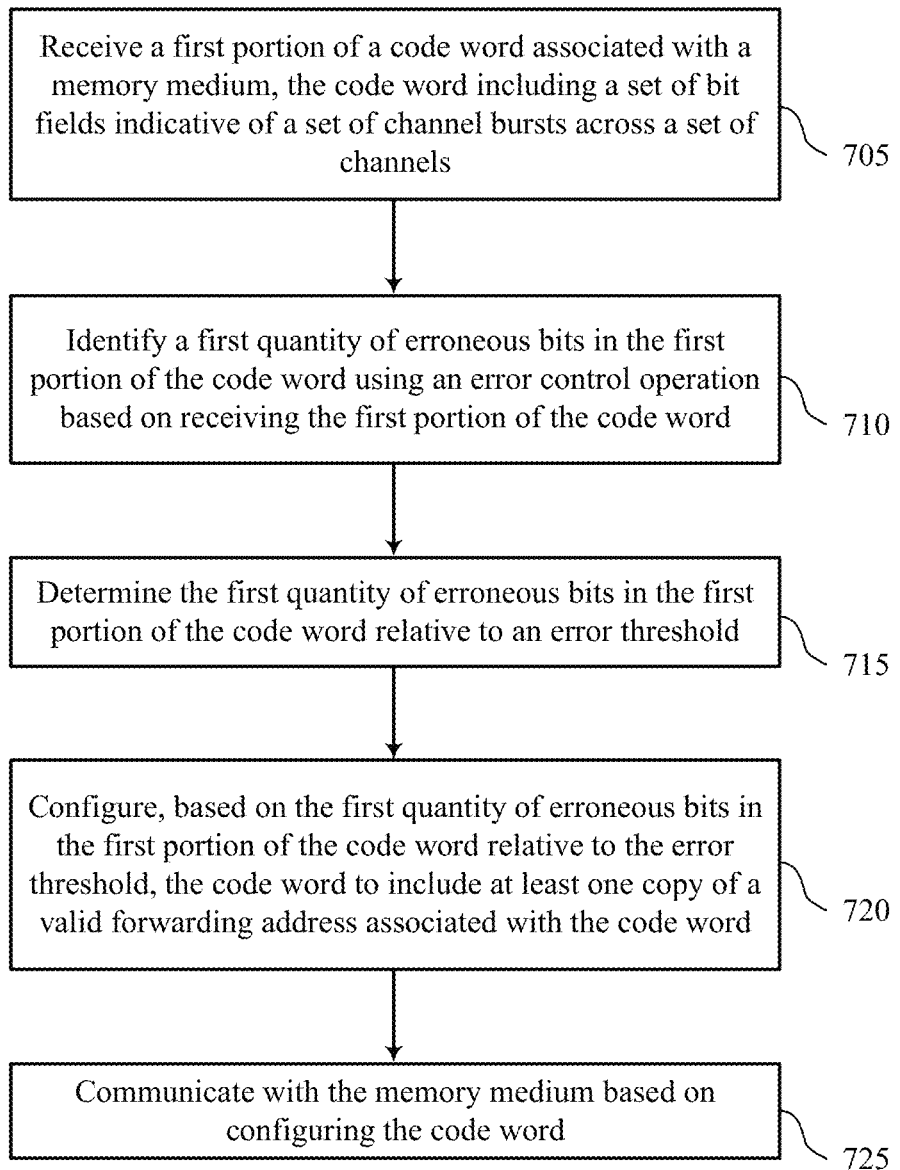

FIG. 7 shows a flowchart illustrating a method 700 that supports forwarding a code word address in accordance with aspects of the present disclosure. The operations of method 700 may be implemented by a controller or its components as described herein. For example, the operations of method 700 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 705 the controller may receive a first portion of a code word associated with a memory medium, the code word including a set of bit fields indicative of a set of channel bursts across a set of channels. The operations of 705 may be performed according to the methods described with reference to FIGS. 2-4. In certain examples, aspects of the operations of 705 may be performed by a channel manager as described with reference to FIG. 4.

At 710 the controller may identify a first quantity of erroneous bits in the first portion of the code word using an error control operation based on receiving the first portion of the code word. The operations of 710 may be performed according to the methods described with reference to FIGS. 2-4. In certain examples, aspects of the operations of 710 may be performed by an error control manager as described with reference to FIG. 4.

At 715 the controller may determine the first quantity of erroneous bits in the first portion of the code word relative to an error threshold. The operations of 715 may be performed according to the methods described with reference to FIGS. 2-4. In certain examples, aspects of the operations of 715 may be performed by an error control manager as described with reference to FIG. 4.

At 720 the controller may configure, based on the first quantity of erroneous bits in the first portion of the code word relative to the error threshold, the code word to include at least one copy of a valid forwarding address associated with the code word. The operations of 720 may be performed according to the methods described with reference to FIGS. 2-4. In certain examples, aspects of the operations of 720 may be performed by a forwarding address manager as described with reference to FIG. 4.

At 725 the controller may communicate with the memory medium based on configuring the code word. The operations of 725 may be performed according to the methods described with reference to FIGS. 2-4. In certain examples, aspects of the operations of 725 may be performed by a channel manager as described with reference to FIG. 4.

An apparatus for performing the method 700 is described. The apparatus may include means for receiving a first portion of a code word associated with a memory medium, the code word including a set of bit fields indicative of a plurality of channel bursts across a plurality of channels, means for identifying a first quantity of erroneous bits in the first portion of the code word using an error control operation based on receiving the first portion of the code word, means for determining the first quantity of erroneous bits in the first portion of the code word relative to an error threshold, means for configuring, based on the first quantity of erroneous bits in the first portion of the code word relative to the error threshold, the code word to include at least one copy of a valid forwarding address associated with the code word, and means for communicating with the memory medium based on configuring the code word.

Another apparatus for performing the method 700 is described. The apparatus may include a memory medium and a controller in electronic communication with the memory medium, where the controller may be operable to receive a first portion of a code word associated with the memory medium, the code word including a set of bit fields indicative of a plurality of channel bursts across a plurality of channels, identify a first quantity of erroneous bits in the first portion of the code word using an error control operation based on receiving the first portion of the code word, determine the first quantity of erroneous bits in the first portion of the code word relative to an error threshold, configure, based on the first quantity of erroneous bits in the first portion of the code word relative to the error threshold, the code word to include at least one copy of a valid forwarding address associated with the code word, and communicate with the memory medium based on configuring the code word.

Some examples of the method 700 and apparatus described herein may further include processes, features, means, or instructions for identifying the error threshold based on identifying the first quantity of erroneous bits, the error threshold associated with a quantity of erroneous bits that the code word is preconfigured to recover. Some examples of the method 700 and apparatus described herein may further include processes, features, means, or instructions for comparing the error threshold and the first quantity of erroneous bits, where the first quantity of erroneous bits relative to the error threshold may be determined based on comparing the error threshold and the first quantity of erroneous bits.

In some examples of the method 700 and apparatus described herein, determining the first quantity of erroneous bits in the first portion of the code word relative to the error threshold further includes determining that the first quantity of erroneous bits in the first portion of the code word may be equal to or greater than the error threshold. Some examples of the method 700 and apparatus described herein may further include processes, features, means, or instructions for configuring the error threshold to a value based on receiving the first portion of the code word associated with the memory medium.

In some examples of the method 700 and apparatus described herein, identifying the first quantity of erroneous bits in the first portion of the code word using the error control operation includes performing an error correction code (ECC) operation on the first portion of the code word. Some examples of the method 700 and apparatus described herein may further include processes, features, means, or instructions for configuring a bit field of the set of bit fields for at least one channel burst of the plurality of channel bursts of the code word, the bit field indicating a code word condition corresponding to a forwarded code word, where configuring the code word may be based on configuring the bit field.

Some examples of the method 700 and apparatus described herein may further include processes, features, means, or instructions for storing copies of the valid forwarding address in the code word, where configuring the code word may be based on storing the copies of the valid forwarding address. Some examples of the method 700 and apparatus described herein may further include processes, features, means, or instructions for configuring a portion of at least one of the copies of the valid forwarding address as spare bits, where configuring the code word may be based on configuring the portion of the at least one of the copies of the valid forwarding address as spare bits.

Some examples of the method 700 and apparatus described herein may further include processes, features, means, or instructions for identifying an occurrence threshold based on the first quantity of erroneous bits relative to the error threshold, the occurrence threshold indicating an allowed quantity of occurrences for the first quantity of erroneous bits exceeding the error threshold, where configuring the code word may be based on the occurrence threshold and the error threshold. In some examples of the method 700 and apparatus described herein, the occurrence threshold may be configurable based on receiving the first portion of the code word associated with the memory medium.

Figure 8:
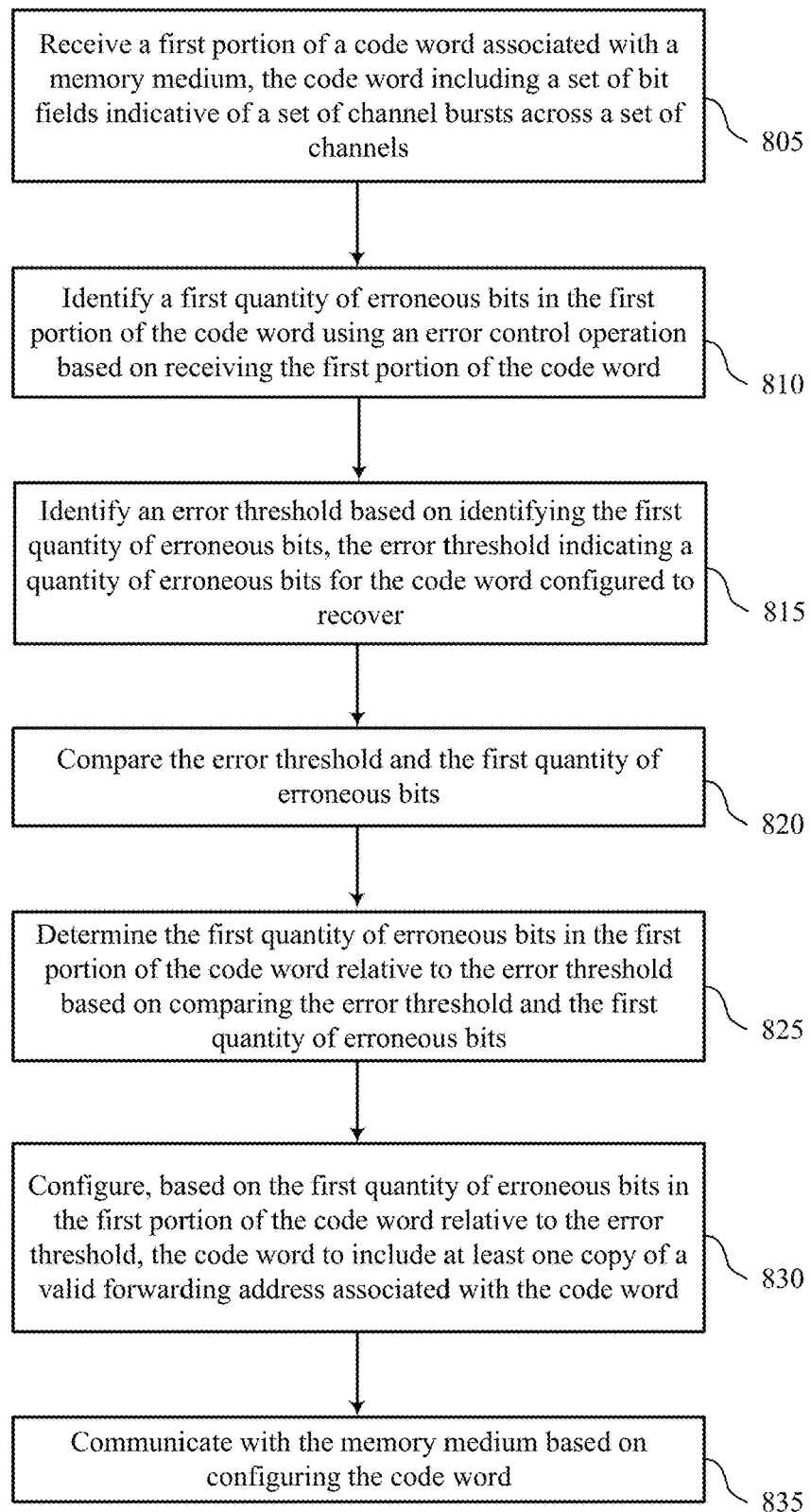

FIG. 8 shows a flowchart illustrating a method 800 that supports forwarding a code word address in accordance with aspects of the present disclosure. The operations of method 800 may be implemented by a controller or its components as described herein. For example, the operations of method 800 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 805 the controller may receive a first portion of a code word associated with a memory medium, the code word including a set of bit fields indicative of a set of channel bursts across a set of channels. The operations of 805 may be performed according to the methods described with reference to FIGS. 2-4. In certain examples, aspects of the operations of 805 may be performed by a channel manager as described with reference to FIG. 4.

At 810 the controller may identify a first quantity of erroneous bits in the first portion of the code word using an error control operation based on receiving the first portion of the code word. The operations of 810 may be performed according to the methods described with reference to FIGS. 2-4. In certain examples, aspects of the operations of 810 may be performed by an error control manager as described with reference to FIG. 4.

At 815 the controller may identify an error threshold based on identifying the first quantity of erroneous bits, the error threshold associated with a quantity of erroneous bits that the code word is preconfigured to recover. The operations of 815 may be performed according to the methods described with reference to FIGS. 2-4. In certain examples, aspects of the operations of 815 may be performed by an error control manager as described with reference to FIG. 4.

At 820 the controller may compare the error threshold and the first quantity of erroneous bits. The operations of 820 may be performed according to the methods described with reference to FIGS. 2-4. In certain examples, aspects of the operations of 820 may be performed by an error control manager as described with reference to FIG. 4.

At 825 the controller may determine the first quantity of erroneous bits in the first portion of the code word relative to the error threshold based on comparing the error threshold and the first quantity of erroneous bits. The operations of 825 may be performed according to the methods described with reference to FIGS. 2-4. In certain examples, aspects of the operations of 825 may be performed by an error control manager as described with reference to FIG. 4.

At 830 the controller may configure, based on the first quantity of erroneous bits in the first portion of the code word relative to the error threshold, the code word to include at least one copy of a valid forwarding address associated with the code word. The operations of 830 may be performed according to the methods described with reference to FIGS. 2-4. In certain examples, aspects of the operations of 830 may be performed by a forwarding address manager as described with reference to FIG. 4.

At 835 the controller may communicate with the memory medium based on configuring the code word. The operations of 835 may be performed according to the methods described with reference to FIGS. 2-4. In certain examples, aspects of the operations of 835 may be performed by a channel manager as described with reference to FIG. 4.

It should be noted that the methods described herein describe possible implementations, and that the operations and the steps may be rearranged or otherwise modified and that other implementations are possible. Further, examples from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The term "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

Chalcogenide materials may be materials or alloys that include at least one of the elements S, Se, and Te. Phase change materials discussed herein may be chalcogenide materials. Chalcogenide materials may include alloys of S, Se, Te, Ge, As, Al, Sb, Au, indium (In), gallium (Ga), tin (Sn), bismuth (Bi), palladium (Pd), cobalt (Co), oxygen (O), silver (Ag), nickel (Ni), platinum (Pt). Example chalcogenide materials and alloys may include, but are not limited to, Ge—Te, In—Se, Sb—Te, Ga—Sb, In—Sb, As—Te, Al—Te, Ge—Sb—Te, Te—Ge—As, In—Sb—Te, Te—Sn—Se, Ge—Se—Ga, Bi—Se—Sb, Ga—Se—Te, Sn—Sb—Te, In—Sb—Ge, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Sb—Se—Te, Ge—Sn—Sb—Te, Ge—Te—Sn—Ni, Ge—Te—Sn—Pd, or Ge—Te—Sn—Pt. The hyphenated chemical composition notation, as used herein, indicates the elements included in a particular compound or alloy and is intended to represent all stoichiometries involving the indicated elements. For example, Ge—Te may include $Ge_xTe_y$, where x and y may be any positive integer. Other examples of variable resistance materials may include binary metal oxide materials or mixed valence oxide including two or more metals, e.g., transition metals, alkaline earth metals, and/or rare earth metals. Examples are not limited to a particular variable resistance material or materials associated with the memory elements of the memory cells. For example, other examples of variable resistance materials can be used to form memory elements and may include chalcogenide materials, colossal magnetoresistive materials, or polymer-based materials, among others.

The devices discussed herein, including memory media 130, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the herein description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving a first portion of a code word associated with a memory medium, the code word comprising a set of bit fields indicative of a plurality of channel bursts across a plurality of channels;
   determining a code word condition indicated in a bit field of the set of bit fields for at least one channel burst of the first portion of the code word, the code word condition comprising a type of the code word indicating a forwarded code word;
   determining a forwarding address of the code word based at least in part on the code word condition; and
   communicating with the memory medium based at least in part on the forwarding address of the code word.

2. The method of claim 1, wherein:
   the forwarded code word comprises the bit field indicating the code word condition and a quantity of duplicates of the forwarding address, and
   determining the forwarding address of the code word is based at least in part on the quantity of duplicates of the forwarding address.

3. The method of claim 1, wherein:
   the at least one channel burst of the first portion of the code word comprises a plurality of duplicates of the forwarding address.

4. The method of claim 3, further comprising:
   determining, based at least in part on the code word condition, a first quantity of address bits across the plurality of duplicates of the forwarding address, each bit of the first quantity of address bits indicating a first logic state of an address bit of the forwarding address, wherein the forwarding address of the code word is determined based at least in part on the first quantity of address bits of the forwarding address.

5. The method of claim 4, further comprising:
   determining that the first quantity of address bits is greater than a threshold quantity of duplicates of the forwarding address in at least the first portion of the code word; and
   assigning the first logic state to the address bit of the forwarding address based at least in part on determining that the first quantity of address bits is greater than the threshold quantity of duplicates of the forwarding address, wherein the forwarding address of the code word is determined based at least in part on assigning the first logic state to the address bit of the forwarding address.

6. The method of claim 1, further comprising:
   receiving a second portion of the code word, concurrent with determining the code word condition, based at least in part on receiving the first portion of the code word.

7. The method of claim 1, further comprising:
   receiving an additional portion of the code word based at least in part on the code word condition, wherein the forwarding address of the code word is determined based at least in part on receiving the additional portion of the code word.

8. The method of claim 7, further comprising:
   identifying a majority logic state of an address bit of the forwarding address across a quantity of duplicates of the forwarding address in the code word; and
   assigning the majority logic state to the address bit of the forwarding address based at least in part on identifying the majority logic state of the address bit, wherein the forwarding address of the code word is determined based at least in part on assigning the majority logic state to the address bit of the forwarding address.

9. The method of claim 8, wherein identifying the majority logic state of the address bit of the forwarding address further comprises:
   determining a first quantity of address bits across the quantity of duplicates of the forwarding address in the code word, each of the first quantity of address bits indicating a first logic state of the address bit of the forwarding address;
   determining a second quantity of address bits across the quantity of duplicates of the forwarding address in the code word, each of the second quantity of address bits indicating a second logic state of the address bit of the forwarding address;

comparing the first quantity of address bits indicating the first logic state and the second quantity of address bits indicating the second logic state; and determining the majority logic state of the address bit of the forwarding address based at least in part on the comparison.

10. The method of claim 1, wherein:

the bit field indicating the code word condition are configured to convey valid information when a first quantity of the bit field are erroneous, wherein the first quantity is less than a threshold associated with a fault tolerance level of the bit field indicating the code word condition.

11. The method of claim 1, further comprising:

transmitting an access command to the memory medium using the forwarding address of the code word, wherein communicating with the memory medium is based at least in part on transmitting the access command.

12. An apparatus, comprising:

a plurality of memory media, at least one memory medium of the plurality configured to generate a code word comprising a set of bit fields indicative of a plurality of channel bursts across a plurality of channels;

at least one host interface configured to receive an access command from a host device; and a plurality of port managers in electronic communication with the at least one host interface and each port manager in electronic communication with different one or more memory media of the plurality, at least one port manager of the plurality is configured to:

receive, based at least in part on receiving the access command, a first portion of the code word comprising a bit field of the set of bit fields for at least one channel burst of the plurality of channel bursts of the first portion of the code word;

determine an indication of a forwarded code word in the first portion of the code word;

determine a forwarding address of the code word based at least in part on the indication of the forwarded code word; and communicate with the at least one of the plurality of memory media or the at least one host interface based at least in part on the forwarding address of the code word.

13. The apparatus of claim 12, wherein the at least one port manager of the plurality is further configured to:

determine a code word condition indicated in the bit field, wherein the indication of the forwarded code word is determined based at least in part on the code word condition.

14. The apparatus of claim 12, wherein the at least one port manager of the plurality is further configured to:

receive an additional portion of the code word after receiving the first portion of the code word, wherein the forwarding address of the code word is determined based at least in part on receiving the additional portion of the code word, and wherein the indication of the forwarded code word is concurrently determined with receiving the additional portion of the code word.

15. The apparatus of claim 14, wherein the at least one port manager of the plurality is further configured to:

determine a first quantity of address bits across a quantity of duplicates of the forwarding address in the code word based at least in part on receiving the additional portion of the code word, each of the first quantity of address bits indicating a first logic state of an address bit of the forwarding address;

determine that the first quantity of address bits is greater than a threshold quantity of duplicates of the forwarding address in the code word; and assign the first logic state to the address bit of the forwarding address based at least in part on determining that the first quantity of address bits is greater than the threshold quantity of duplicates of the forwarding address in the code word, wherein the forwarding address of the code word is determined based at least in part on assigning the first logic state to the address bit of the forwarding address.

16. A method, comprising:

receiving a first portion of a code word associated with a memory medium, the code word comprising a set of bit fields indicative of a plurality of channel bursts across a plurality of channels;

identifying a first quantity of erroneous bits in the first portion of the code word using an error control operation based at least in part on receiving the first portion of the code word;

determining the first quantity of erroneous bits in the first portion of the code word relative to an error threshold;

configuring, based at least in part on the first quantity of erroneous bits in the first portion of the code word relative to the error threshold, the code word to comprise at least one copy of a valid forwarding address associated with the code word; and communicating with the memory medium based at least in part on configuring the code word.

17. The method of claim 16, further comprising:

identifying the error threshold based at least in part on identifying the first quantity of erroneous bits, the error threshold associated with a quantity of erroneous bits that the code word is preconfigured to recover; and comparing the error threshold and the first quantity of erroneous bits, wherein the first quantity of erroneous bits relative to the error threshold is determined based at least in part on comparing the error threshold and the first quantity of erroneous bits.

18. The method of claim 16, wherein determining the first quantity of erroneous bits in the first portion of the code word relative to the error threshold further comprises:

determining that the first quantity of erroneous bits in the first portion of the code word is equal to or greater than the error threshold.

19. The method of claim 16, further comprising:

configuring the error threshold to a value based at least in part on receiving the first portion of the code word associated with the memory medium.

20. The method of claim 16, wherein identifying the first quantity of erroneous bits in the first portion of the code word using the error control operation comprises:

performing an error correction code (ECC) operation on the first portion of the code word.

21. The method of claim 16, further comprising:

configuring a bit field of the set of bit fields for at least one channel burst of the plurality of channel bursts of the code word, the bit field indicating a code word condition corresponding to a forwarded code word, wherein configuring the code word is based at least in part on configuring the bit field.

22. The method of claim 16, further comprising:
storing copies of the valid forwarding address in the code word, wherein configuring the code word is based at least in part on storing the copies of the valid forwarding address.

23. The method of claim 22, further comprising:
configuring a portion of at least one of the copies of the valid forwarding address as spare bits, wherein configuring the code word is based at least in part on configuring the portion of the at least one of the copies of the valid forwarding address as spare bits.

24. The method of claim 16, further comprising:
identifying an occurrence threshold based at least in part on the first quantity of erroneous bits relative to the error threshold, the occurrence threshold indicating an allowed quantity of occurrences for the first quantity of erroneous bits exceeding the error threshold, wherein configuring the code word is based at least in part on the occurrence threshold and the error threshold.

25. The method of claim 24, wherein the occurrence threshold is configurable based at least in part on receiving the first portion of the code word associated with the memory medium.

\* \* \* \* \*